United States Patent
Valmikam et al.

(10) Patent No.: US 8,208,430 B2
(45) Date of Patent: Jun. 26, 2012

(54) TRANSPARENT INTERACTION WITH MULTI-LAYER PROTOCOLS VIA SELECTIVE BRIDGING AND PROXYING

(75) Inventors: Ravi Valmikam, Westford, MA (US); Charles Boyle, Upton, MA (US); Nitin Rana, Bangalore (IN); Surya Kumar Kovvali, Westborough, MA (US); Christopher Leary, Amherst, NH (US)

(73) Assignee: Movik Networks, Littleton, MA (US)

( * ) Notice: Subject to any disclaimer, the term of this patent is extended or adjusted under 35 U.S.C. 154(b) by 208 days.

(21) Appl. No.: 12/645,009

(22) Filed: Dec. 22, 2009

(65) Prior Publication Data

US 2010/0158026 A1 Jun. 24, 2010

Related U.S. Application Data

(60) Provisional application No. 61/140,165, filed on Dec. 23, 2008.

(51) Int. Cl.
*H04Q 7/00* (2006.01)
*H04L 12/28* (2006.01)

(52) U.S. Cl. ........................... 370/328; 370/401

(58) Field of Classification Search ............... 370/285, 370/310.1, 310.2, 315, 328, 401, 469
See application file for complete search history.

(56) References Cited

U.S. PATENT DOCUMENTS

| | | | |
|---|---|---|---|
| 6,694,349 B1 | 2/2004 | Zou | |
| 6,907,501 B2 | 6/2005 | Tariq et al. | |
| 6,996,085 B2 * | 2/2006 | Travostino et al. | 370/338 |
| 7,318,100 B2 * | 1/2008 | Demmer et al. | 709/229 |
| 7,739,383 B1 * | 6/2010 | Short et al. | 709/226 |
| 8,111,630 B2 | 2/2012 | Kovvali et al. | |
| 2003/0003919 A1 | 1/2003 | Beming et al. | |
| 2003/0120805 A1 | 6/2003 | Couts et al. | |
| 2004/0068571 A1 | 4/2004 | Ahmavaara | |

(Continued)

FOREIGN PATENT DOCUMENTS

| | | |
|---|---|---|
| EP | 2197187 A1 | 6/2010 |
| WO | 2008/076073 A1 | 6/2008 |

OTHER PUBLICATIONS

International Search Report and Written Opinion dated May 13, 2011 in co-pending foreign patent application No. PCT/US11/28477.

(Continued)

*Primary Examiner* — Hong Cho
(74) *Attorney, Agent, or Firm* — Nields, Lemack & Frame, LLC

(57) ABSTRACT

The current invention defines a device and a method of logically inserting the device between two other network devices, for example, in a 3GPP Radio Access Network. The device transparently monitors and interacts with one or more control protocol layers in the two neighboring devices. The invention defines methods by which the intercepting node selectively passes through or proxies (selectively modifying portions of the protocols content) in such as way that the neighbor nodes are un-aware of the intercepting device. The proxy operation implies that the intercepting node is capable of terminating some protocol elements, injecting some protocol elements, or modifying protocol elements before forwarding them in such a way that the operation is transparent to neighboring nodes. These selective insertion/modifications facilitate identifying signaling connections for specific mobile clients, and enhancing and modifying service features for dataplane accesses for those client devices, while transparently passing other protocol messages.

23 Claims, 8 Drawing Sheets

Logical Placement of New Device (MPTP) in 3G/UMTS Network

U.S. PATENT DOCUMENTS

| | | | |
|---|---|---|---|
| 2004/0264368 A1 | 12/2004 | Heiskari et al. | |
| 2005/0135428 A1 | 6/2005 | Hellgren | |
| 2005/0136973 A1 | 6/2005 | Llamas et al. | |
| 2005/0157646 A1 | 7/2005 | Addagatla et al. | |
| 2006/0018294 A1 | 1/2006 | Kynaslahti et al. | |
| 2006/0117139 A1 | 6/2006 | Kobayashi et al. | |
| 2006/0159121 A1 | 7/2006 | Sakata et al. | |
| 2006/0274688 A1 | 12/2006 | Maxwell et al. | |
| 2007/0025301 A1* | 2/2007 | Petersson et al. | 370/338 |
| 2007/0223379 A1 | 9/2007 | Sivakumar et al. | |
| 2007/0254671 A1 | 11/2007 | Liu | |
| 2008/0026789 A1 | 1/2008 | Llamas et al. | |
| 2008/0186912 A1 | 8/2008 | Huomo | |
| 2008/0191816 A1 | 8/2008 | Balachandran et al. | |
| 2009/0029644 A1 | 1/2009 | Sue et al. | |
| 2009/0156213 A1 | 6/2009 | Spinelli et al. | |
| 2009/0196233 A1 | 8/2009 | Zhu et al. | |
| 2009/0210904 A1 | 8/2009 | Baron et al. | |
| 2009/0274224 A1 | 11/2009 | Harris | |
| 2010/0020685 A1* | 1/2010 | Short et al. | 370/230 |
| 2010/0034089 A1 | 2/2010 | Kovvali et al. | |
| 2010/0057887 A1 | 3/2010 | Wang et al. | |
| 2010/0085962 A1 | 4/2010 | Issaeva et al. | |
| 2010/0184421 A1 | 7/2010 | Lindqvist et al. | |
| 2010/0195602 A1 | 8/2010 | Kovvali et al. | |
| 2010/0215015 A1 | 8/2010 | Miao et al. | |
| 2010/0272021 A1 | 10/2010 | Kopplin et al. | |
| 2011/0167170 A1 | 7/2011 | Kovvali et al. | |

OTHER PUBLICATIONS

3GPP TR 23.829 V0.4.0 (Jan. 2010), Technical Report, "3rd Generation Partnership Project; Technical Specification Group Services and System Aspects; Local IP Access and Selected IP Traffic Offload; (Release 10)", 29 pages, 3GPP Organizational Partners.

Http header enrichment, http://news.thomasnet.com/fullstory/Software-optimizes-high-speed-wireless-data-networks-485934, "Software optimizes high-speed wireless data networks", Jun. 26, 2006, 10 pages, Thomasnet News.

Office Action dated Mar. 15, 2011 in co-pending U.S. Appl. No. 12/536,537.

International Search Report/Written Opinion dated Mar. 1, 2010 in corresponding application (PCT/US2009/069260).

International Search Report/Written Opinion dated Mar. 12, 2010 in co-pending application (PCT/US2010/22542).

International Search Report/Written Opinion dated Oct. 6, 2009 in co-pending application (PCT/US2009/052871).

RFC 1644—T/TCP—TCP Extensions for Translations Functional Specification, R. Braden, 1994, Jul. 1994—http://www.faqs.org/rfcs/rfc1644.html.

RFC 3135—Performance Enhancing Proxies Intended to Mitigate Link-Related Degradations, J. Border et al.; Jun. 2001—http://www.faqs.org.rfcs/rfc3135.html.

RFC 2045—Multipurpose Internet Mail Extensions (MIME) Part One: Formal of Internet Message bodies; N. Freed et al.; Nov. 1996—http://www.faqs.org/rfcs/rfc2045.html.

International Search Report/Written Opinion mailed Feb. 29, 2012 in co-pending PCT application No. PCT/US2011/044156.

International Search Report/Written Opinion mailed Feb. 29, 2012 in co-pending PCT application No. PCT/US2011/044361.

International Preliminary Report on Patentability mailed Feb. 23, 2012 in co-pending PCT application No. PCT/US09/52871.

Notice of Allowance mailed Oct. 13, 2011 in co-pending U.S. Appl. No. 12/536,537.

* cited by examiner

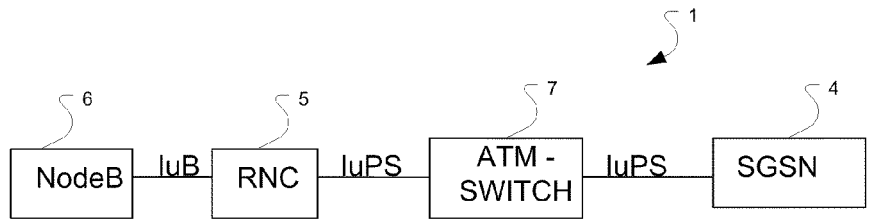
*(a) UMTS Radio Access Network
(Prior Art)*
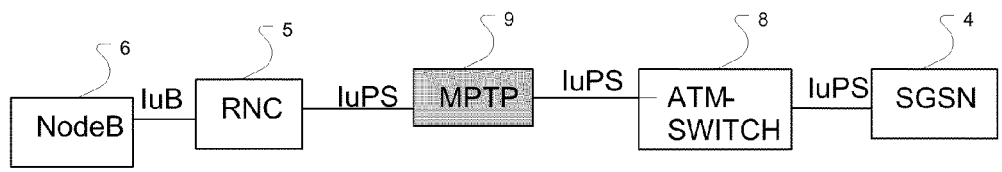
MPTP: New Device per current Invention
*(b) Physical Placement of the device on IuPS Interface*
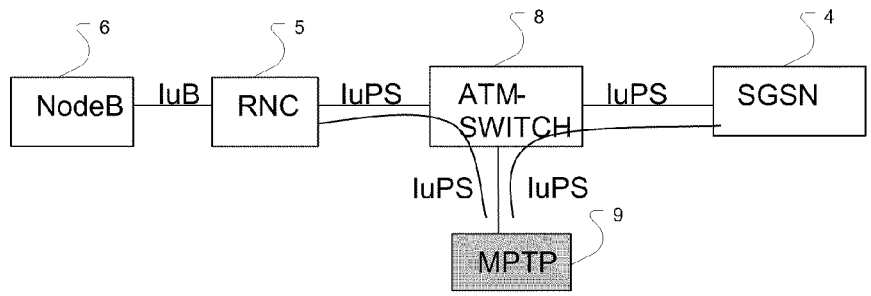
*(c) Logical placement of the device between RNC and SGSN*
Figure 1: Example Network Configuration with new device

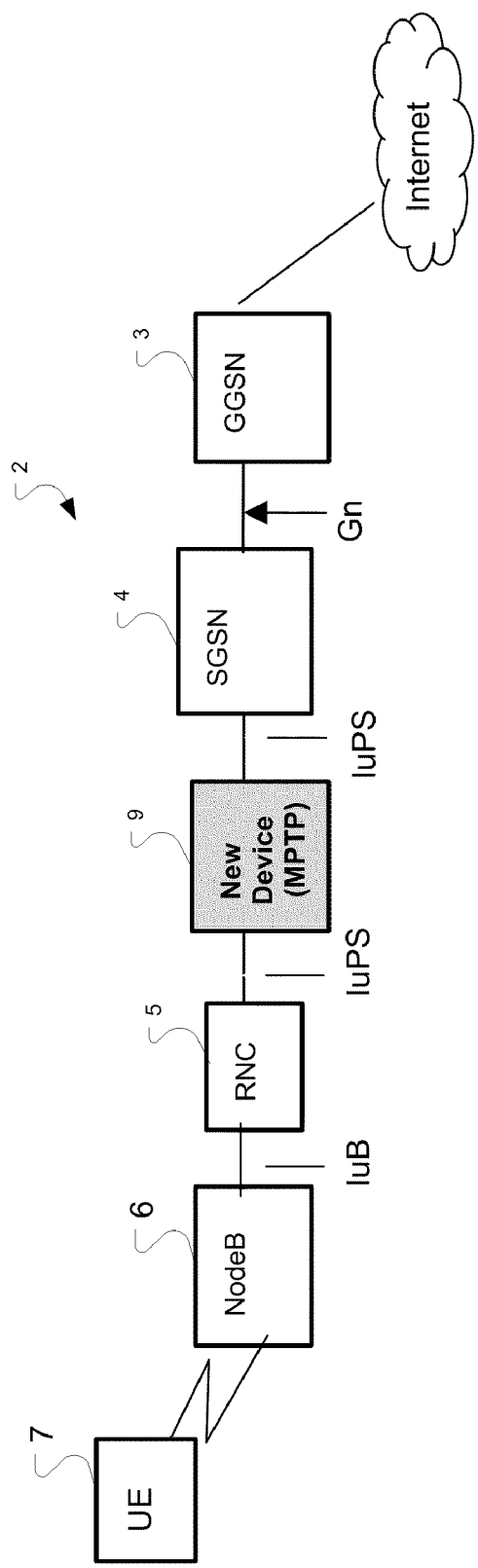
Figure 2: Logical Placement of New Device (MPTP) in 3G/UMTS Network

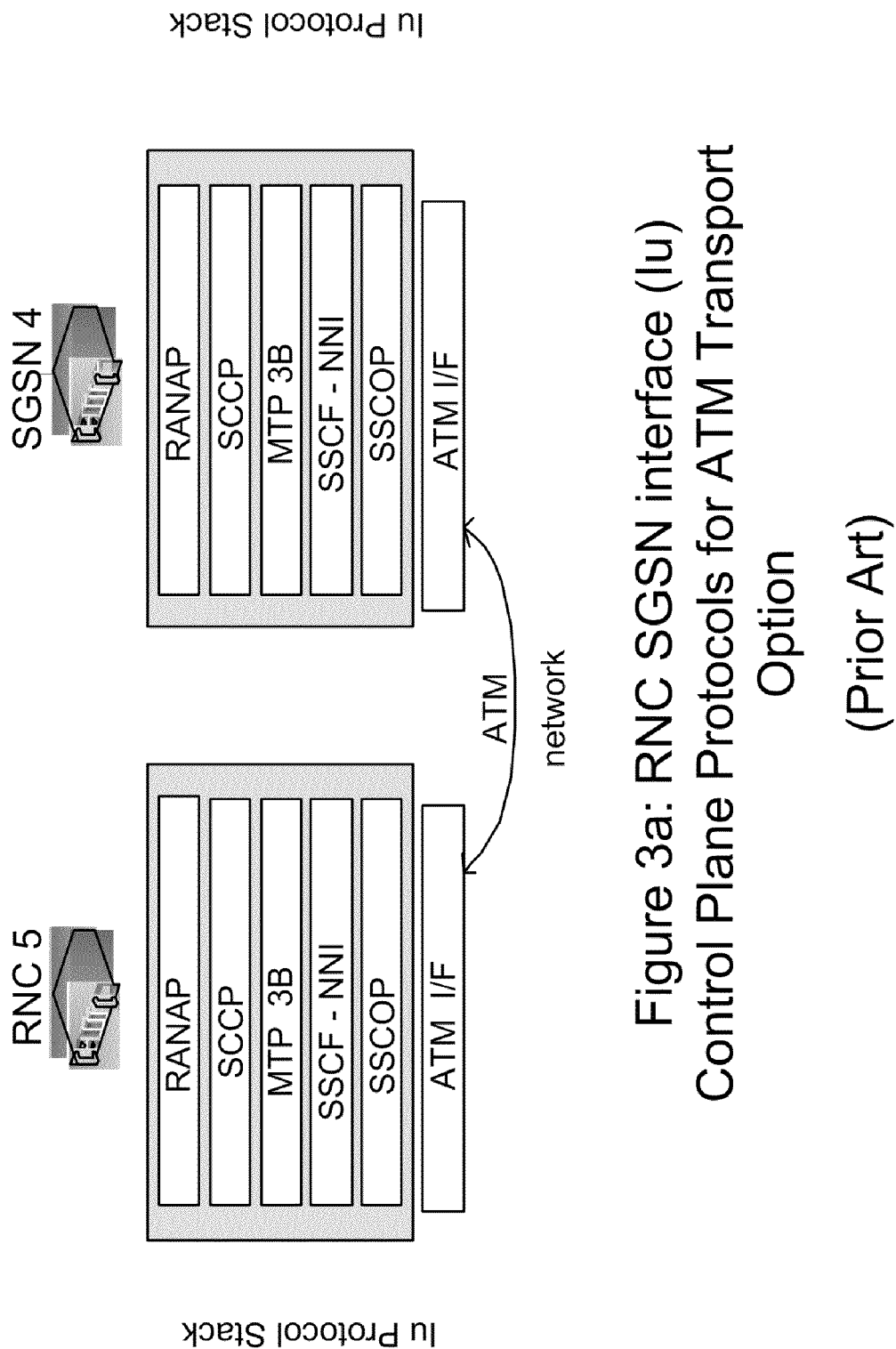
Figure 3a: RNC SGSN interface (Iu) Control Plane Protocols for ATM Transport Option
(Prior Art)

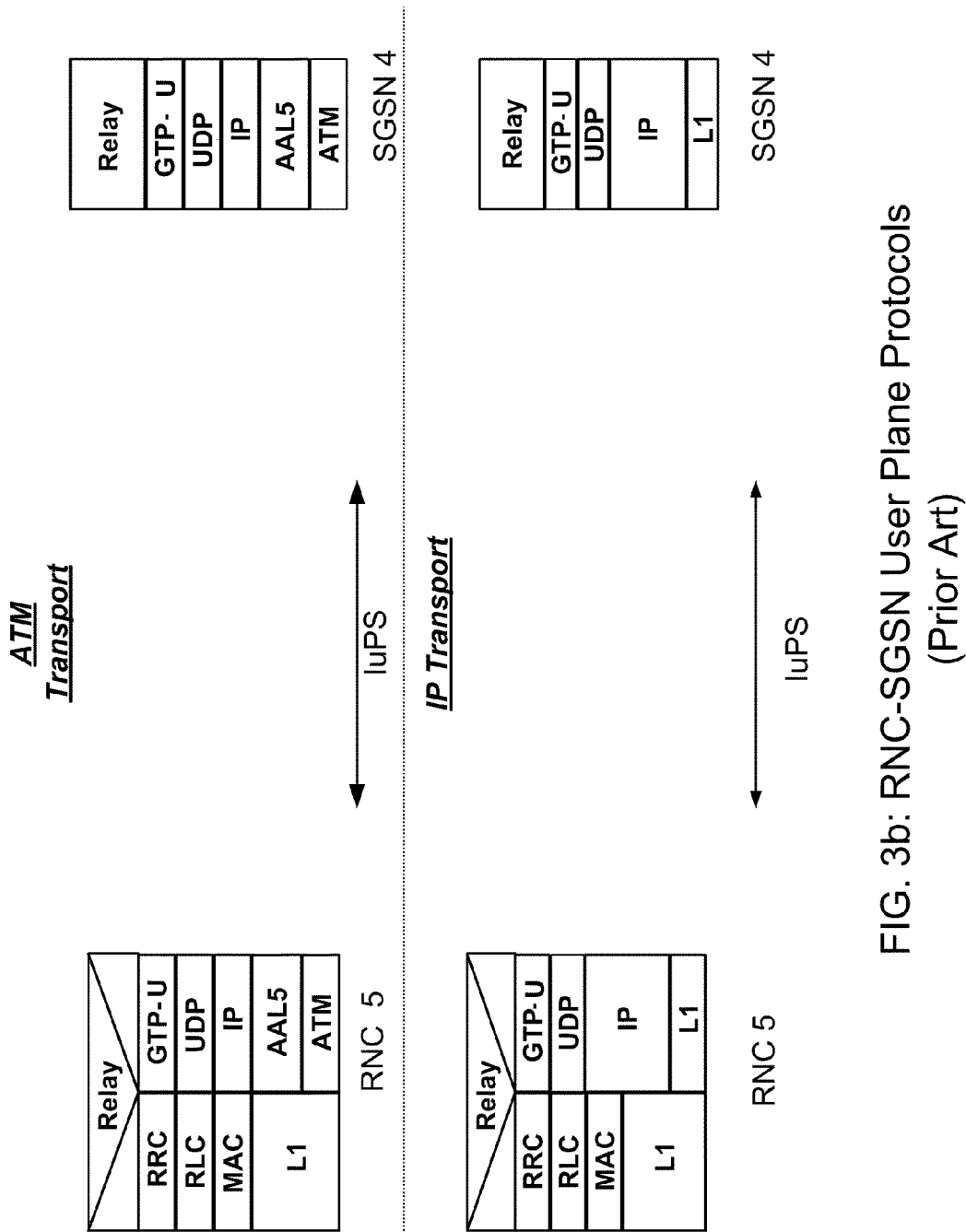
FIG. 3b: RNC-SGSN User Plane Protocols (Prior Art)

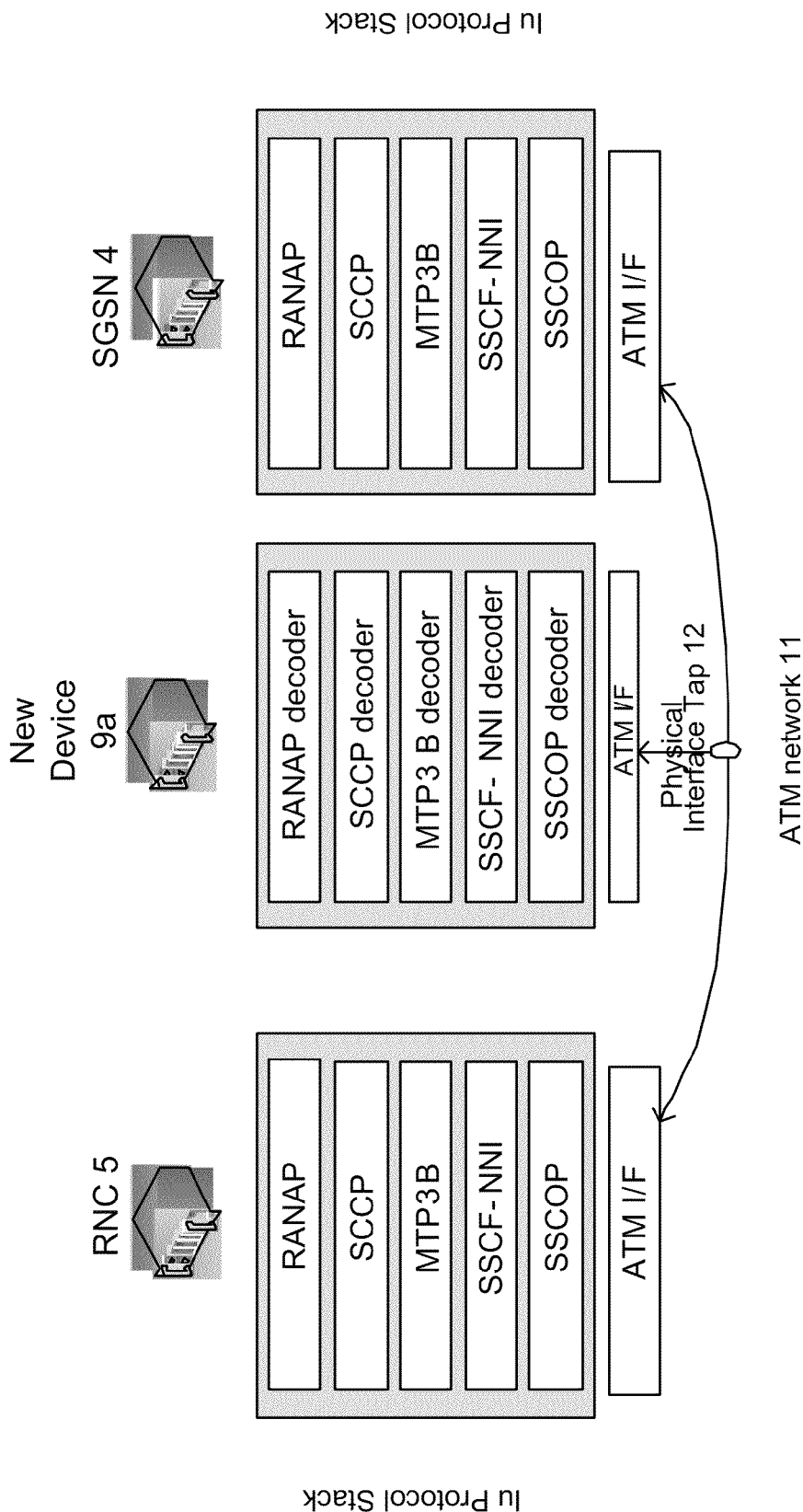
Figure 4: Embodiment 1 - Monitor Mode

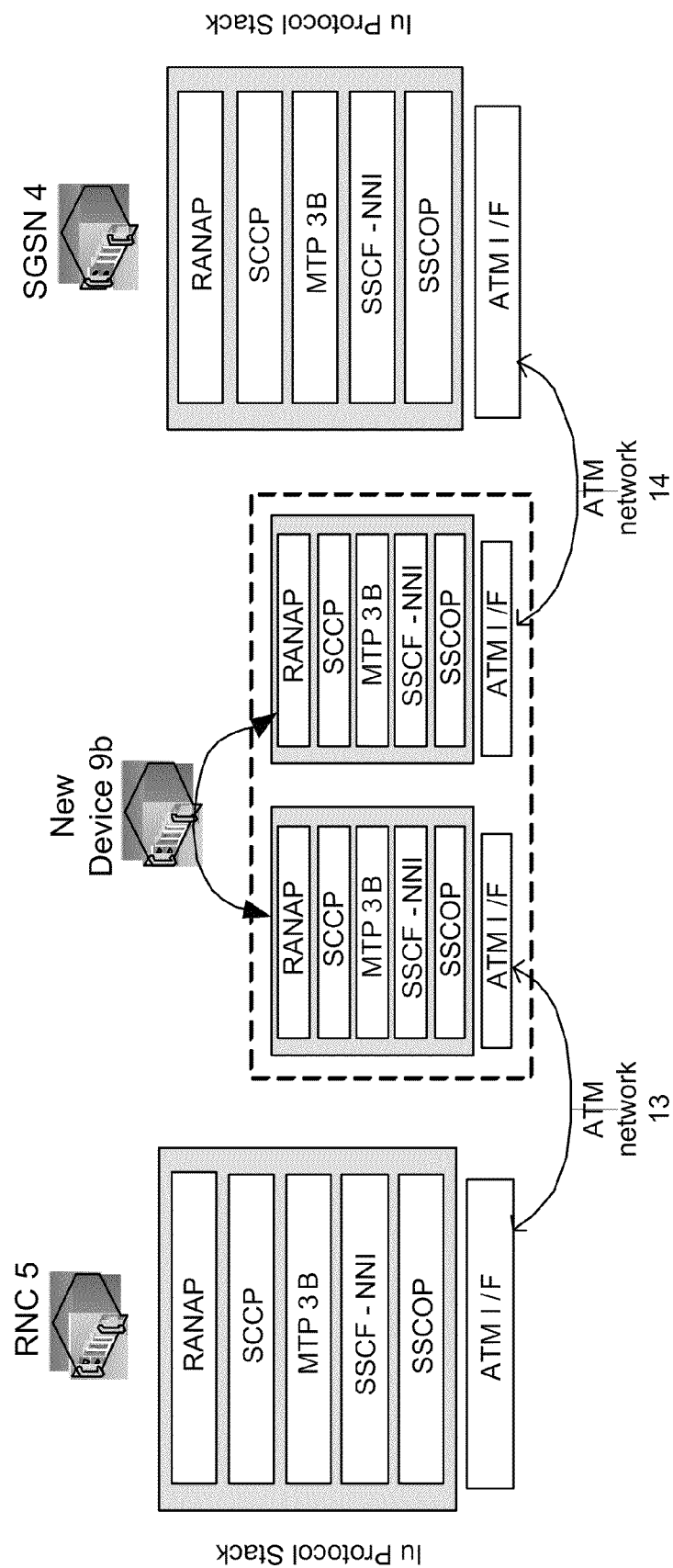
Figure 5: Embodiment 2 –
Back-to-back mode

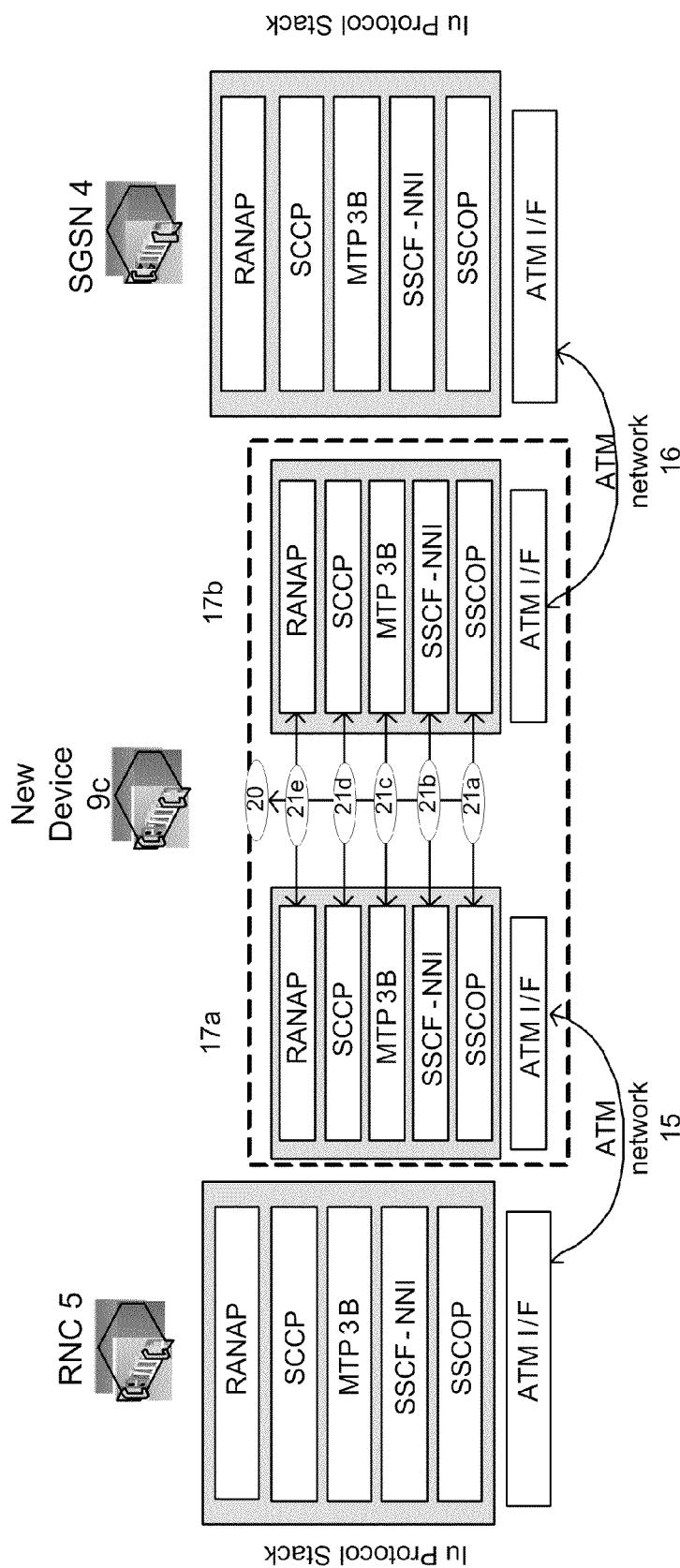
Figure 6: Embodiment 3 – Multi-Protocol Transparent Proxy

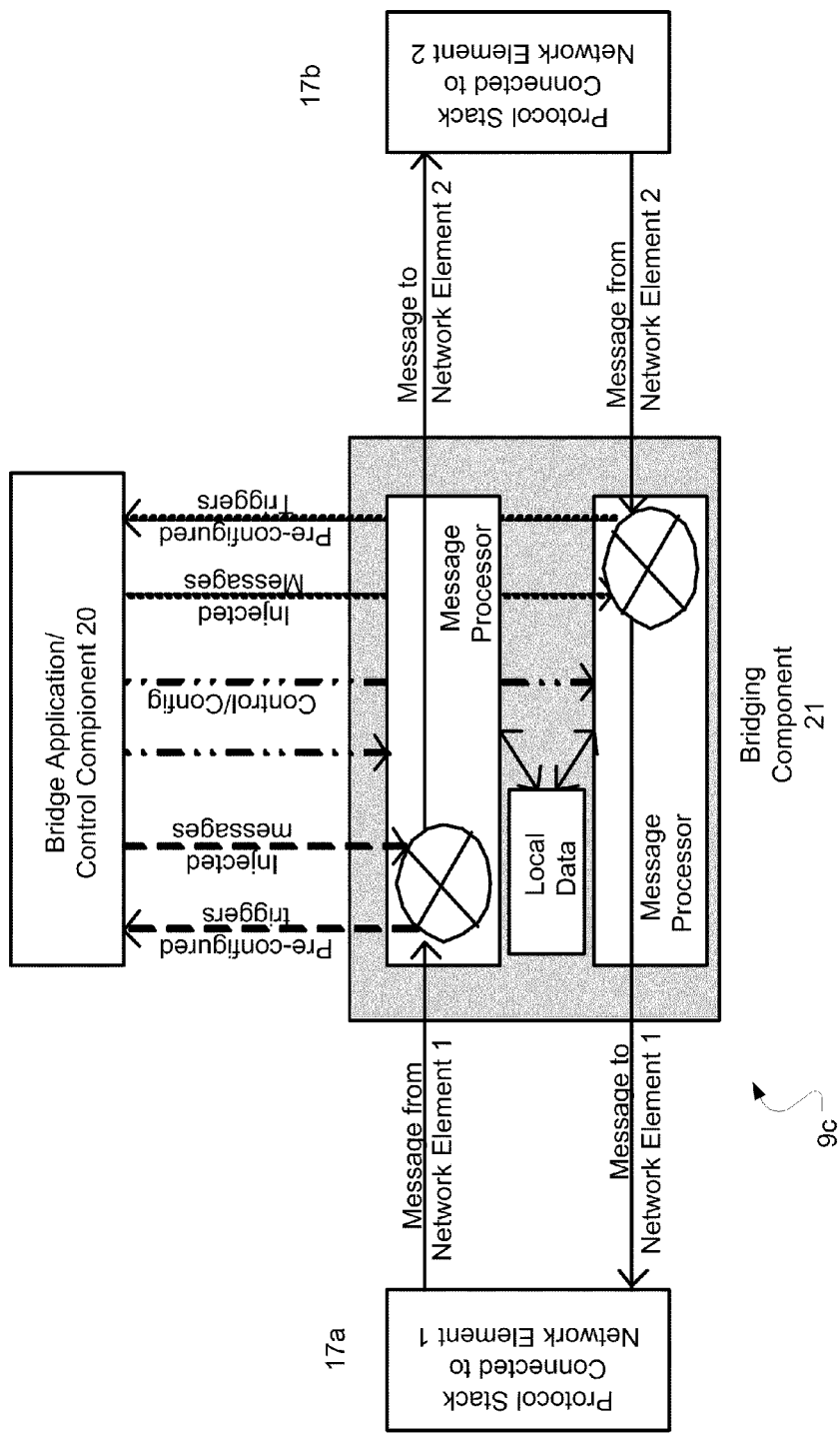
Figure 7: Description of a Bridging Component

TRANSPARENT INTERACTION WITH MULTI-LAYER PROTOCOLS VIA SELECTIVE BRIDGING AND PROXYING

This application claims priority of U.S. Provisional Patent Application Ser. No. 61/140,165, filed Dec. 23, 2008, the disclosure of which is herein incorporated by reference in its entirety.

BACKGROUND

Often, there is a desire to introduce a new network element into an existing network such as 3GPP network. This desire could be driven by many diverse requirements, such as improving network performance, monitoring network conditions, improvement of user experience, improving security aspects of the network or the user or for any of the myriad of things that are possible. Such a device may need to be placed logically as a "bump in the wire" in the network, in the sense that it is placed between two devices and both devices are unaware of the newly introduced device. Such a placement of the new device could be either physically in-line between the two devices or logically in-line, such that the traffic is routed through the new device.

Protocol standards define one or more layers of control protocol interactions between two devices over a connected interface. These control protocol operations define actions to be performed by each device while interacting with an adjacent device, or neighbor for managing user data-plane sessions. Examples of such operations include establishing, modifying, and terminating a user data plane session, such as Packet Data Protocol (PDP) context, or creating, modifying, and terminating a Radio Access Bearer (RAB) for active PDP context in 3GPP/UMTS mobile network. When a "bump in the wire" type device, as described above, is placed between two standards-defined communication devices, this new device will be operating outside the scope of the corresponding control protocol standards. Thus, the new device does not have any identity in the respective protocol framework. The interfaces shown (IuB, IuPS etc.) in the accompanying figures are logical protocol interfaces and may be transported through ATM or IP transports per 3GPP/UMTS standards. The interface protocol standards define both the control protocols for managing user sessions through the mobile network, as well as the user plane packet encapsulation protocols. The focus of the current invention is control plane protocols on these interfaces.

FIG. 1 exemplifies the placement of a "bump in the wire" device per the current invention on the IuPS interface in a 3G/UMTS network 1. FIG. 1a shows a traditional UTMS Radio access network. A Serving GPRS Support Node (SGSN) 4 is responsible for the delivery of data packets from and to the mobile stations within its geographical service area. The Radio Network Controller (or RNC) 5 is a governing element in the radio access network and is responsible for controlling the NodeBs 6 that are connected to it. NodeB 6 is a term used to denote the base transceiver station (BTS) in the UMTS/3GPP Architecture. One or more RNCs at different locations are connected to one or more SGSNs through an ATM or IP transport network. This example shows RNC 5 connected to SGSN 4 through ATM-Switch 7 using the IuPS logical interface; this means both RNC and SGSN are connected to an ATM Switch, one or more ATM-VCs are configured through the ATM-Switch 7, and IuPS protocols are carried through the ATM-VCs.

FIG. 1b represents the placement of the new device 9 physically inline within the network shown in FIG. 1a. In this embodiment, the new device 9 is logically placed between the SGSN 4 and the RNC 5 through the ATM-Switch 8, and utilizes the IuPS protocol on both of its interfaces. In other words, it appears as the RNC 5 to the SGSN 4 and as the SGSN 4 to the RNC 5 on the IuPS logical interface. FIG. 1c shows the new device placement logically inline between the RNC 5 and SGSN 4 through the ATM-Switch; i.e., the ATM Switch is configured to terminate the IuPS ATM-VCs from the RNC 5 and the SGSN 4 in the new device 9, and the new device performs the operations identified in the current invention.

Many types of bridges exist. For example, protocol bridges, such as Layer 2 Ethernet bridges (IEEE 802.1D, 802.1Q), operate by intercepting Ethernet Layer 2 MAC Header, and using these headers to build internal forwarding tables to associate Layer 2 MAC Addresses with 1 or more forwarding ports within the Bridge. The goals of such a bridge are to extend the interconnectivity between the connected devices (i.e. the number of nodes that can participate in the Layer 2 network), extend the network reach beyond the Ethernet Physical Layer, and increase the total Bandwidth among a number of nodes by providing simultaneous packet transfer operations. These Layer 2 bridges forward packets received from one interface to one or more interfaces based on their Layer 2 Header without modifying the packet contents.

Layer 3 forwarding devices, such as IP routers, intercept packets from one or more interfaces, and forward them to one or more interfaces. Depending on the type of lower layer transport they are connected to, these devices may modify the Layer 2 headers. The goal of such devices is to extend the Network Connectivity at Layer 3 among a number of devices, and increase the Bandwidth among a large number of devices.

Repeaters, such as Ethernet Repeaters, extend the physical reachability of the two devices that they connect to (i.e. the distance between devices is increased). They terminate or extend the corresponding link layer protocols and forward upper layer packets from one interface to another.

Each of these prior art devices simply forwards existing packets to one or more destinations. In some embodiments, the device modifies the packet, typically at the Layer 2 or Layer 3 level to expand the network. However, it may be desirable and advantageous to introduce new messages into the network, or to terminate other flows.

SUMMARY OF THE INVENTION

The current invention describes a device and method for intercepting multi-layer control protocols and selectively bridge (relay packets from one interface to another without modification), or inject or terminate certain streams, or modify certain protocol contents. The objective of the current invention is to extend Peer-to-Peer protocols between two standard network devices in a transparent way, in the sense that the presence of new device is unknown to the two peers.

In some embodiments, this new device can then offer enhanced features such as monitoring, new session initiation for delivering locally cached content, etc. Some of these value-added benefits are described in co-pending U.S. patent application Ser. No. 12/536,537, entitled "Content Caching is a Radio Access Network", the disclosure of which is herein incorporated by reference in its entirety.

This new device is termed a "Multi-Protocol Transparent Proxy (MPTP)". The MPTP device intercepts one or more control protocols on the interface that it connects to. Depending on the device configuration and supported features, the MPTP forwards (relays packets from one interface to another without modification), injects or terminates certain protocol packets, thus operating as proxy, or receives certain protocol packets from one interface, modifies the packet contents and forwards to the other interface.

The methods and procedures per the current invention are exemplified using Control protocols on the IuPS interface (IuPS-CP) between RNC and SGSN in UMTS Radio Access Network. However, they apply to other protocol interfaces, such as IuB, Gn, GI interfaces in the UMTS network, or other network protocols such as in LTE, 3GPP2, and WIMAX network Architectures, and therefore are not limited to one specific embodiment.

BRIEF DESCRIPTION OF THE DRAWINGS

FIG. 1a shows a RAN network of the prior art;

FIG. 1b shows the RAN network of FIG. 1a with an inserted device in accordance with one embodiment;

FIG. 1c shows the logical placement of the device in FIG. 1b;

FIG. 2 shows the logical placement of the device in accordance with one embodiment;

FIG. 3a shows the RNC SGSN interface control plane protocols for ATM transport option;

FIG. 3b shows the RNC SGSN interface User Plane Protocols for both ATM and IP transport options;

FIG. 4 shows one embodiment of the present invention;

FIG. 5 shows a second embodiment of the present invention;

FIG. 6 shows a third embodiment of the present invention; and

FIG. 7 shows a block diagram of a bridging component.

DETAILED DESCRIPTION OF THE INVENTION

FIG. 2 shows a 3G/UMTS network 2. The GGSN 3 (Gateway GPRS Service Node) connects the mobile wireless network to the IP Core Network. The Gateway GPRS Support Node (GGSN) 3 is a main component of the GPRS (General Packet Radio Service) network. The GGSN 3 is responsible for compatibility between the GPRS network and external packet switched networks, such as the Internet and X.25 networks.

When viewed from an external network, the GGSN 3 appears as a router to a sub-network, because the GGSN 3 hides the GPRS infrastructure from the external network. When the GGSN 3 receives data addressed to a specific user, it checks if the user is active. If it is, the GGSN 3 forwards the data to the SGSN 4 serving the mobile user. However if the mobile user is inactive, the data are discarded, or a paging procedure is initiated to locate and notify the mobile device. For data originated within the GPRS network, the GGSN 3 routes these mobile-originated packets to the correct external network.

The GGSN 3 converts the GPRS packets coming from the SGSN 4 into the appropriate packet data protocol (PDP) format (e.g., IP or X.25) and sends them out on the corresponding packet data network. For incoming packets, the PDP addresses are converted to the GSM address of the destination user. The readdressed packets are then sent to the responsible SGSN 4. In order to accomplish this function, the GGSN 3 stores the current SGSN address of the user and its associated profile in its location register. The GGSN 3 is responsible for IP address assignment and is the default router for the connected user equipment (UE) 7. The GGSN 3 also performs authentication functions.

A Serving GPRS Support Node (SGSN) 4 is responsible for the delivery of data packets from and to the mobile stations within its geographical service area. Its tasks include packet routing and transfer, mobility management (attach/detach and location management), logical link management, and authentication and charging functions. The location register of the SGSN 4 stores location information and user profiles of all GPRS users registered with this SGSN 4.

The Radio Network Controller (or RNC) 5 is a governing element in the radio access network and is responsible for controlling the Node Bs 6 that are connected to it. The RNC 5 carries out radio resource management, some of the mobility management functions and is the point where encryption is done before user data is sent to and from the mobile. The RNC 5 connects to the SGSN (Serving GPRS Support Node) 4 in the Packet Switched Core Network.

Node B 6 is a term used to denote the base transceiver station (BTS) in the UMTS/3GPP Architecture. As in all cellular systems, such as GSM, Node B (or BTS) 6 contains radio frequency transmitter(s) and the receiver(s) used to communicate directly with the user equipment, which move freely around it.

The user equipment (UE) 7 comprises all user equipment, including handsets, smart phones and computing equipment. A Node B is likely to be connected to a plurality of user equipment. Thus, a single Node B may communicate with multiple mobile clients, each utilizing one or more UE 7.

The following examples shows the insertion of the new device between the RNC and the SGSN, as shown in FIG. 2. As stated earlier, the present invention is not limited to this embodiment, as the device may be inserted between any two devices in the network.

3GPP Technical Specifications [1-4] define Control Plane and User Plane protocols for IuPS interface between RNC (Radio Network Controller), and SGSN (Serving Gateway Service Node). The Control Plane protocols are shown in FIG. 3a, while the User Plane Protocols are shown in FIG. 3b. The standards define alternative options for control plane protocols depending on the type of the underlying network interface (ATM or IP). While the current invention is exemplified using one of the ATM protocol stack options, the methods and the procedures are equally applicable to other protocol variations as well.

In operation, software operates at each level to parse the information required at that level. After the protocol information for that layer has been stripped off, the remainder of the packet is forwarded to the next higher protocol layer. This process continues until the packet has been fully decomposed. In the case of pass-through traffic, the packet is then reconstructed by appending protocol information as the packet is passed down the layers. In other words, packet headers are reattached in the opposite order in which they are removed, such that the L1 information is the first to be removed on an incoming packet and the last to be appended on an outgoing packet.

FIG. 3b illustrates the User Plane Protocols that exist on the IuPS interface in 3GPP/UMTS network, as shown in FIG. 2. As the name implies, the user plane is used to deliver the data requested by the user, such as web pages, and the like. This figure shows the IP and ATM transport options as specified in the 3GPP Standards. The protocol names shown in the figure (L1, MAC, RLC, RRC, GTP-U, AAL5, ATM etc.) are as specified in 3GPP TS25.401, *UTRAN Overall Description*, which is herein incorporated by reference in its entirety.

There are a number of embodiments that can be used to insert a new device into this network. The first embodiment, also known as monitor mode interception, is shown in FIG. 4.

In this mode, the new device 9a monitors (sniffs) the physical interface between two nodes, such as the RNC 5 and the SGSN 4, and decodes any packets transmitted on that interface and propagates these packets to higher level applications. The new device 9a is physically inserted into the ATM network 11, using a physical interface tap 12. The protocol stack may be a pared down, or reduced, version, in the sense that it does not hold any active data.

Though this mode can help implement the new device quickly, it has serious limitations in terms of its ability to inject and modify protocol messages. This limitation comes in due to the limitations of "tapping". "Tapping" is typically a one-way process used to listen to or observe communication on a physical interface 11. As such, it is difficult to insert messages into the stream even if that tap 12 is two-way at the physical layer. This is due to the complexity of correctly guessing various protocol sequence numbers and timing within that protocol.

In other words, as packets are passing between two devices, such as RNC 5 and SGSN 4, over the network 11, each packet carries one or more sequence numbers, which allow the receiving node to confirm that packets are sequential and none have been lost. Attempting to insert packets into this stream requires that the new packets contain sequence numbers that match those expected by the receiving node. Furthermore, since the sending node is unaware of this new device, it will also use those sequence numbers, thereby resulting in lost of corrupted data.

A second embodiment, referred to as back-to-back mode, is shown in FIG. 5. In this mode, the new device 9b intercepts the physical interface and breaks it into two physical interfaces 13,14. The new device 9b implements full protocol layers to completely terminate the protocol communication on each side and connects the interface protocol at the application level.

Though this method gives tremendous flexibility in terms of various features the new device 9b can implement, it suffers from several significant drawbacks in terms of network scalability and deployment. These drawbacks include:

- The new device 9b needs a complete network identity, in the sense that it needs to be visible to the link partner on each interface 13,14. This may be a problem in existing networks where identities are precious resources tightly controlled by network operators.
- The new device needs to be introduced into the network by manually modifying the configuration on each of the two devices with which it is interfacing. This may be a problem because in existing networks, there could thousands of such pairs and re-configuring each such pair is a tremendous task that can overwhelm and dissuade an operator from deploying such a solution.
- This method also breaks the existing "neighbor" relationship between the two devices. This might break any health monitoring, resource monitoring and other proprietary messaging that the two devices implement between them.
- The intercepting device may or may not understand and be able to bridge 100% of the messages. This will create incompatibility between the two devices.

A third embodiment, known as multi-protocol transparent proxy (MPTP) is identified in the current invention and is shown in FIG. 6. This method offers several advantages over the back-to-back embodiment.

First, the intermediate (or newly inserted) device 9c does not need a network identity. It merely intercepts the physical interface and bridges messages at each layer. Bridging, in this context, means forwarding a given protocol packet to the peer after minor (or no) modifications to make it acceptable to the peer. These modifications include, but are not limited to, sequence number adjustments, checksum updates and other parameter updates depending upon the specific protocol layer. However, it does not terminate the communication protocol, as is done in the previous embodiment.

The MPTP device 9c performs the above operations at each of the protocol layers. FIG. 6 shows the protocol stack for one embodiment of the present invention. The MPTP implements two sets of protocol stacks 17a, 17b, one stack associated with each of the neighboring devices. Some layers may need more modifications than the other layers. Some layers do not need any modifications at all, in which case the MPTP device forwards the received protocol packet (or segment of the protocol packet) from one interface onto the other interface.

A packet may reach the device 9c such as via ATM network 15. The packet is passed upward through the associated protocols on one protocol stack 17a. While processing the protocol layers, the MPTP device 9c simply relays the messages from one interface to the other (such as across from stack 17a to stack 17b) if it is not of interest or if it is not understood. Thus, it does not suffer from the drawback described with the back-to-back mode, in the case of new or not understood protocol messages.

This model allows for network applications to be incorporated into the MPTP device 9c. The various protocol layers provide information about the connections and the remote devices. In some embodiments, the MPTP 9c will also present some of the protocol messages to an application resident on the new device. This helps the new device 9c understand and act upon the protocol exchange in order to implement any additional features that may be of interest. Applications can control the layers to enable presentation of only a certain set of messages. Further sections explore various embodiments of this filtering mechanism.

Depending on the feature requirements and application needs, MPTP 9c can also inject messages into the protocol stream 17a, 17b (on either side). When messages are injected, the protocol stack may adjust the protocol parameters (such as, but not limited to, sequence numbers, and checksum) before propagating the messages to the other device.

Implementation of the MPTP mode can be defined in terms of two types of components; a Bridge Application/Control component 20 and a Protocol Bridging Component 21.

FIG. 7 shows both of these components with their respective interfaces. These components include a processing unit, memory and a set of instructions to perform the required functions. In some embodiments, each component 20, 21a-e (as shown in FIG. 6) has a dedicated processor, memory and mechanism to interact with the other components. The processing unit may be any suitable device, including but not limited to a general purpose CPU, or a special purpose processor, such as one incorporated into a custom or semi-custom integrated circuit. The processing unit interfaces with a memory device, which contains the instructions to be executed by the processing unit, as well as additional memory to store variables, parameters and other information. The memory can be semiconductor memory, such as DRAM, RAM, ROM, FRAM, or EEPROM, or can be magnetic media, such as a hard disk drive. In some embodiments, at least a portion of the memory is non-volatile so that it withstands power failures. The component also includes a mechanism by which to communicate with other components. For example, a local network interconnect, or a shared memory structure can be used to exchange information between the components. Other mechanisms are known and within the scope of the invention.

In other embodiments, a processor is shared between two or more components. For example, the bridging components 21a-f may utilize a single processing unit, where the instructions are organized such that each protocol layer represents a different task or routine executing on the processing unit. In other embodiments, the bridge application/control component 20 shares a processing unit with one or more of the bridging components 21.

The instructions to be executed can be written in any suitable programming language. Furthermore, the operating system employed by the processing unit (if any) is application specific, and is not limited by the present invention.

Bridge Application/Control Component

This bridge application/control component 20 drives the functionality of the new device 9c. To do this, the component 20 interfaces with one or more bridging components 21a-e (as shown in FIG. 6). With this interface, it can control and configure the bridging component 21 of each protocol layer. This control and configuration can have many different purposes.

The bridge application/control component 20 determines the specific messages or classes of messages that it would like to receive. In one embodiment, it configures the bridging components 21a-e with the appropriate configuration information. This configuration information could be a complex filtering criterion that could include information from the message headers, message body or the transport information for a specific message. The bridge application/control component 20 may generate multiple filter criteria per protocol layer, and different filter criteria at each protocol layer if desired.

Having determined and configured the bridging components 21 to intercept certain messages, the bridge application/control component 20 may also instruct the bridging components 21 as to the action to be taken upon detection of a message matching the selected parameters.

For example, the bridge application/control component 20 may instruct the bridging component 21 to perform one of the following functions, including but not limited to:

Copy and forward—this may be the normal case for most of the protocol packets. By copying the packet locally, the MPTP device recognizes the protocol state.

Redirect to bridge application—this may be the case for responses that are generated by the remote device for locally inserted protocol messages or packets that need to be modified.

Insert—this allows the bridge application/control component to insert new protocol messages on interface locally, i.e., these messages, which are sent on one interface were not received from the other interface. An example use of this feature is to initiate a new Radio Access Bearer for delivering locally cached content.

Discard—this allows the bridging component to simply eliminate the received packet. For example, retransmitted packets received from one interface, forwarded to the neighbor and acknowledgements received from that neighbor could be discarded.

The bridge application/control component 20 may also receive and process messages that the bridging component forwards/redirects towards this component 20. This processing may include modifying certain elements and forwarding to the other protocol stack, completely consuming the packet within the component 20, or simply discarding the packet.

In addition to processing packets received by the MPTP 9c, the bridge application/control component 20 may also inject new messages into a particular layer. These messages could be completely new messages, responses to previously intercepted messages, or blank messages to synchronize protocol or transport level messages such as to maintain proper sequence numbers. For example, the bridge application may be a web cache, which has a storage element filled with commonly used web pages. In response to a request for an uncached website, the bridge application/control component 20 would simply allow the request to pass through the MPTP 9c. If, however, the requested web page were resident in local memory, the bridge application 20 would intercept the request and respond to it, as if it were the remote web server.

The bridge application/control component 20 may also modify messages received from the bridging component 21. In some embodiments, the bridge application/control component 20 modifies an information element, where an information element is any data within the packet such as that which describes the client, user session or specific transaction. For example, during the establishment of a new user session, the bridge application/control component 20 may modify various parameters, including but not limited to QOS parameters, service class, and priority. In the case of a previously established user session, the bridge application/control component 20 may modify parameters including Radio Access Bearer.

Bridging Component

Bridging component 21 interfaces with the bridge application/control component 20 and protocol layers on each side, and performs the following operations. FIG. 6 shows a separate bridging component 21 at each layer of the protocol stack. However, a single component may be used to control two or more protocol layers, if desired. For example, a single processing unit may be used for multiple bridging components, where the software executed by the processing unit is partitioned for the various protocol layers. In addition, it may be desirable to have two bridging components where one operates at one or more protocol layers on stack 17a, and a second bridging component operates on the same protocol layers on stack 17b. These two bridging components would be communicating between one another to implement the required functions.

The bridging component 21 stores local data including protocol states, sequence numbers, configuration and control information. In certain implementations, this local data may not exist.

Optionally it maintains statistics and error information concerning the particular layer.

The bridging component 21 provides a management interface to control and view logs, statistics and errors. In certain implementations, this functionality could be omitted completely.

As explained above, the bridging component 21 receives the control/configuration information from bridge application/control component 20 that instructs it as to which messages are of interest, and what action to take on these messages. The bridging component 21 filters messages based on this received configuration. The possible actions of the bridging component 21 include:

If a message matches the desired parameters and the action is "copy and forward", the bridging component 21 sends a copy of the message to bridge application/control component 20 and forwards the message to its peer on the second interface (such as from stack 17a to stack 17b). In some instances, the message is modified prior to its transmission on the second interface. In other embodiments, it is forwarded without modification.

If a message matches the desired parameters and the action is "redirect", it redirects the message to the bridge application/control component 20.

If a message matches the desired parameters and the action is "discard", the bridging component 21 simply discards it.

In some embodiments, the bridging component 21 may have default or additional logic contained within it. In this embodiment, the bridging component 21 may operate using this additional logic, in addition to the above-described filters. For example, if, based on context, the bridging component 21 determines that a message need not be inserted into the peer stream, this bridging component 21 might simply discard it.

In the scenario where the bridge application/control component 20 decides to inject a new message into the stream, the message is formatted per the corresponding protocol and sent to the appropriate protocol stack and appropriate protocol layer by the bridging component 21. The bridge application/control component 20 is aware of the protocol layer that the new message utilizes, and therefore knows the appropriate bridging component 21 to send the packet to.

The bridging component 21 is also responsible for ensuring that the messages are coherent or "sane" with respect to that protocol. This might include adjusting information within the messages such as sequence numbers, checksum, information consistency and formatting.

It is important to note that the bridging component 21 above may be an independent component located between the two protocol stacks (as shown in FIGS. 6 and 7) or its functionality can be integrated into the corresponding layer within the protocol stack. Sometimes, its functionality can be split and incorporated into the two protocol entities on the two interfaces it is bridging. For example, the copy and forward operation of the bridging component between the 2 SSCOP layers may be incorporated into the two SSCOP entities.

There are various advantages of the multi-protocol transparent proxy. For example, as explained above, the new device does not need a network identity, thus preserving precious network resources. In addition, deployment of the MPTP is trivial, as the network operator does not need to modify the configuration of existing devices. Since the device does not have an identity, it is invisible to its neighbors. Similarly, removing a MPTP from a network is straightforward, since no modifications were made during deployment. Additionally, the MPTP has complete access to all the protocol messages. This enables it to implement any value added features. This solution does not break the compatibility between the existing devices.

The Multi-Protocol Transparent Proxy device and methods defined herein facilitate the insertion of new devices transparently into a protocol stack. This allows enhanced features such as monitoring, business intelligence gathering, content insertion, and protocol enhancements on one interface without affecting the other interface.

To do this, the new device intercepts and selectively performs one or more of the following operations:

Operates transparently as a "bump in the wire" (interface) without being visible to the peers on the either side of the interface.

Intercepts peer-to-peer protocols without requiring an identity (visible address in the protocols that it is intercepting).

Selectively forwards protocol packets (or portions of the protocol packets) received from one interface to the other.

Selectively modifies certain protocol packets (or portions of) received from one interface before forwarding to the other. This modification may include changing an information element, where an information element may be any information associated with the user session. In the case of the establishment of a new user session, these information elements may include QOS parameters, service class, and priority. In the case of a previously established user session, these information elements may include Radio Access Bearer.

Selectively filters certain protocol packets, facilitates configurable filtering rules, at the same time adjusting the protocol fields so as to retain the integrity of the protocol.

Based on application usage and feature requirements, injects new protocol messages at one or more protocol layers while adjusting the protocol fields such as sequence numbers, checksums etc., to retain the integrity of the specific protocol.

Having defined one physical embodiment and the various features of the transparent proxy, the following describes the operation of the proxy. As described above, the protocol stack in FIG. 3a is used in the Control Plane over the IuPS interface to create new user-plane sessions between a mobile device to the Core Network (SGSN, GGSN, Internet). The control plane uses separate signaling connection (SCCP connection in UMTS Architecture) between the User Equipment (UE) and the SGSN. Thus each UE will have a separate connection to the SGSN. Since the Bridge Application/Control component has access to all messages of interest, it can determine which messages are associated with each UE. Based on this, the Bridge Application/Control component can perform actions based on specific mobile clients or specific types of UE.

For example, the bridge application/control component may determine, based on messages in the control protocol, the capabilities of a particular mobile client, such as its device type and associated screen size. Similarly, it can determine the services to which the mobile client is entitled, such as its QoS and service plane attributes. Based on this, the bridge application/control component may attempt to enhance the experience of a specific mobile client by creating a secondary PDP context. However, it may only perform this if the client device is a particular device, such as a interconnect card for a laptop or portable computer, and if the subscriber is authorized to receive the enhanced experience.

An example of the operation of the present invention is in the creation of a new secondary user plane session (Secondary PDP Context) for viewing video, where the video may be resident locally in the device. FIG. 3b shows the various user plane protocols. These user plane protocols may also exist within the device 9 (similar to the control plane protocols, shown in FIG. 6). Thus, the secondary user plane session exists between the UE and the device 9 and does not extend to the core network.

Creating such a user session requires RANAP protocol operations through the RNC to the UE. When the bridge application determines such a new secondary user session needs to be created, it need to insert new RANAP messages for this particular UE connection. All other messages that are not relevant to this UE are forwarded as Copy and Forward. In other words, the proxy device 9 needs to create new control plane messages which are required before a user session can be established. Referring to FIG. 6, the device inserts RANAP messages on the protocol stack 17a, which pass to the RNC 5.

RANAP Messages are carried over the SCCP transport connection that maintains sequenced message delivery using message sequence numbers, and retransmission. In other words, each message has a unique sequence number and these numbers are guaranteed to be sequential to allow the recipient to know when a message has been lost.

Before the device 9 inserts any new messages for the newly created connection, sequence numbers will be identical on the two interfaces 17a, 17b in each direction. In other words, messages received on one interface are always forwarded to the second interface. Thus, there is a one-to-one correspondence between RANAP messages received on one interface and sent on the second interface.

However, when the device 9 generates a new RANAP message, that message is directed only toward the RNC 5. Therefore, there are RANAP messages that exit the device toward the RNC 5, which were not generated by the SGSN 4. Since these are not received or sent on the interface to SGSN 4, the sequence numbers for this specific UE on the two interfaces no longer match.

Thus, future messages that use this specific UE SCCP connection would be transmitted by the bridging component after the sequence numbers are adjusted to match the expected sequence numbers by the remote peer on each interface.

After the new RANAP message is inserted by the device 9 as described above and sent to the RNC 5, the remote peer returns a response message. Since the original RANAP message was not received from the SGSN interface, the response message received on the RNC/IuPS interface is processed by the device 9. Since the network upstream is unaware of this response, the message is consumed by the MPTP device, so that it is not forwarded to the SGSN 4.

The connection-oriented transport by SCCP uses sequence numbers and packet retransmissions. Thus, the remote peer retransmits a packet with the same sequence number. If the local protocol/bridging entity recognizes this packet as a duplicate, it may discard the message depending on the protocol state. Similarly, the remote peer may request retransmission of a message if it detects a missing packet. Such a packet may be a locally inserted packet, or a packet received from remote device and forwarded. By maintaining a sequence number map that defines whether the specific packet is locally inserted or forwarded on each interface, the MPTP device 9 determines whether the retransmission request needs to be forwarded or responded to locally.

This example shows the four basic operations of the device, when manipulating messages in the control plane. First, the device 9 can simply choose to bridge the message between the RNC 5 and the SGSN 4. In this mode, the device 9 may or may not modify the message (such as manipulating the sequence number) as it bridges the message. Second, the device 9 can choose to copy the message and forward it. This allows the device to track the control plane state. Third, the device 9 can insert messages, as described above. Finally, the device can delete or discard messages, such as those that are terminated within the device.

Though this disclosure focuses on a specific interface (Iu on ATM), the methods and procedures are applicable to any interface protocol between any pair of devices. Other embodiments include:

Iu interface based on IP network
IuB interface
Gn interface
Gi interface
And interfaces in other technologies (WiMAX, LTE etc.)

What is claimed is:

1. A transparent proxy device utilizing a multi-layer protocol, wherein said protocol comprising a control plane and a user plane, comprising:
   a. two interfaces, and wherein one of said interfaces is connected to a first of two neighboring communication devices, and a second of said interfaces is connected to a second of said neighboring communication devices, wherein said proxy device decodes the multi-layer protocol stack on each of said two interfaces, receives messages on said two interfaces, and operates such that the existence of said proxy device is unknown to said two neighboring communication devices;
   b. a bridge application/control component to decode messages in said control plane; and
   c. one or more bridging components, each controlled by said bridge application/control component and each operating at one or more protocol layers, wherein said bridging components receive control/configuration information from said bridge application/control component, based on said decoded control plane messages, that instructs it as to what action to take on said messages at said one or more protocol layers.

2. The device of claim 1, wherein said actions are selected from the group consisting of copy the message locally and forward said message to the second interface without any modifications to said message; copy the message locally, and forward said message to the second interface after modifications to said message; insert a locally generated message at the specific protocol layer(s) at which said bridging component is operating; discard the message; and redirect the message to the bridge application.

3. The device of claim 2, wherein said messages received by said device are from a plurality of mobile clients, and wherein said bridge application/control component identifies messages associated with each of said plurality of mobile clients based on said control plane.

4. The device of claim 3, wherein said bridge application/control component controls said bridging components to perform said actions on a particular mobile client.

5. The device of claim 3, wherein said device is configured to determine the capabilities, QOS and service plane attributes granted by the network to each of said plurality of mobile clients.

6. The device of claim 1, wherein said multi-layer protocol comprises a control protocol for a 3GPP network.

7. The device of claim 6, wherein said control protocol is used to create user data sessions, or Radio Access Bearers.

8. The device of claim 1, wherein said two neighboring communication devices are selected from the group consisting of a Radio Network Controller (RNC) and a Serving GPRS Support Node (SGSN).

9. The device of claim 1, wherein said bridge application/control component controls a bridging component at one or more protocol layers to modify said messages received from one interface before forwarding on said second interface.

10. The device of claim 9, wherein said modification comprises changing information elements.

11. The device of claim 10, wherein said protocol is used to establish a new user session and said information elements comprises QOS parameters, service class, and priority.

12. The device of claim 10, wherein said protocol is used with a previously established user session, and said information elements comprise Radio Access Bearer.

13. The device of claim 1, wherein said bridge application/control component, together with said bridging component at one or more specific protocol layers, is configured to insert a locally generated message to one interface, without affecting said second interface.

14. The device of claim 13, wherein said locally generated message is used to create a new user session from said proxy device to a mobile client.

15. The device of claim 1, wherein said messages contain sequence numbers and said device modifies said sequence numbers to retain coherency.

16. The device of claim 15, wherein said message having said modified sequence number is inserted in correct sequence and protocol state of said protocol layer.

17. The device of claim 15, wherein said sequence number are modified when new local messages are inserted, or when responses to locally inserted messages are received.

18. The device of claim 1, wherein said bridge application/control component initiates a network connection with at least one of said neighboring communications devices.

19. The device of claim 1, wherein said bridging components comprises a filter mechanism, wherein said bridge application/control component supplies control/configuration information to said filter, and actions to be performed on messages meeting said control/configuration information.

20. The device of claim 19, wherein said bridging component executes said action based on control/configuration information supplied to said filter mechanism.

21. A method of adding new functionality to an existing network, comprising:
incorporating a transparent proxy device utilizing a multi-layer protocol, said protocol comprising a control plane and a user plane, wherein said device comprises two interfaces, and wherein one of said interfaces is connected to a first of two neighboring communication devices, and a second of said interfaces is connected to a second of said neighboring communication devices, and wherein said proxy device decodes the multi-layer protocol stack on each of said two interfaces, receives messages on said two interfaces, decodes messages in said control plane, and operates such that the existence of said proxy device is unknown to said two neighboring communication devices.

22. The method of claim 21, wherein said proxy device is configured to take an action on each of said messages received on said two interfaces, based on information received in said control plane.

23. The method of claim 22, wherein said actions are selected from the group consisting of copy the message locally and forward said message to the second interface without any modifications to said message; copy the message locally, and forward said message to the second interface after modifications to said message; insert a locally generated message at the specific protocol layer(s); discard the message; and redirect the message to a bridge application resident within said proxy device.

* * * * *